US009198172B2

United States Patent
Kanterakis (10) Patent No.: US 9,198,172 B2
(45) Date of Patent: *Nov. 24, 2015

(54) DEFERRED ACCESS METHOD FOR UPLINK PACKET CHANNEL (71) Applicant: Google Inc., Mountain View, CA (US)

(72) Inventor: Emmanuel Kanterakis, North Brunswick, NJ (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/524,777

(22) Filed: Oct. 27, 2014

(65) Prior Publication Data

US 2015/0092714 A1 Apr. 2, 2015

Related U.S. Application Data (63) Continuation of application No. 12/965,361, filed on Dec. 10, 2010, now Pat. No. 8,873,478, which is a continuation of application No. 12/233,176, filed on Sep. 18, 2008, now Pat. No. 7,869,404, which is a continuation of application No. 10/935,236, filed on Sep. 8, 2004, now Pat. No. 7,436,801.

(51) Int. Cl.
H04W 4/00 (2009.01)
H04J 3/16 (2006.01)
H04W 74/00 (2009.01)
H04W 74/08 (2009.01)
H04W 72/04 (2009.01)
H04L 5/00 (2006.01)
H04W 88/02 (2009.01)
H04W 88/08 (2009.01)

(52) U.S. Cl.
CPC ......... *H04W 72/0413* (2013.01); *H04L 5/0055* (2013.01); *H04W 72/0426* (2013.01); *H04W 74/008* (2013.01); *H04W 74/0866* (2013.01); *H04W 74/0833* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 6,169,759 B1 | 1/2001 | Kanterakis et al. |
| 6,301,286 B1 | 10/2001 | Kanterakis et al. |
| 6,389,056 B1 | 5/2002 | Kanterakis et al. |
| 6,507,601 B2 | 1/2003 | Parsa et al. |
| 6,574,267 B1 | 6/2003 | Kanterakis et al. |
| 6,606,341 B1 | 8/2003 | Kanterakis et al. |
| 6,639,936 B2 | 10/2003 | Kanterakis et al. |
| 6,717,975 B2 | 4/2004 | Kanterakis et al. |

(Continued)

*Primary Examiner* — Chi H Pham
*Assistant Examiner* — Soon-Dong D Hyun
(74) *Attorney, Agent, or Firm* — Morris & Kamlay LLP (57) ABSTRACT The equipment and techniques disclosed herein introduce a deferred acknowledgement (DACK), in the context of a protocol for a wireless station to request and obtain access to a wireless network resource for communication of one or more data packets. Essentially, a network node, such as a wireless base station, sends the DACK instruction in response to the access request telling the requesting station that the node has heard the request but that the requesting station should defer its transmission. The requesting station need not back off and re-initiate its access request. Instead, the requesting station waits for a later acknowledgement (ACK) granting access to a resource as requested. Although the DACK provides additional signaling, this technique can still utilize a fast ACK type message, that is to say a relatively short signaling packet.

10 Claims, 8 Drawing Sheets

UPCH method showing Ramp-Up, Acknowledgement, deferrence and packet transmission for two UEs.

(56) References Cited

U.S. PATENT DOCUMENTS

| | | |
|---|---|---|
| 6,757,319 B1 | 6/2004 | Parsa et al. |
| 6,775,707 B1 | 8/2004 | Bennett et al. |
| 6,873,611 B2 | 3/2005 | Rios |
| 6,934,297 B1 | 8/2005 | Bensaou et al. |
| 7,002,943 B2 | 2/2006 | Bhagwat et al. |
| 7,111,070 B2 | 9/2006 | Bennett et al. |
| 7,136,361 B2 | 11/2006 | Benveniste |
| 7,420,984 B2 | 9/2008 | Chen et al. |
| 7,436,801 B1 | 10/2008 | Kanterakis |
| 2003/0223476 A1 | 12/2003 | Kanterakis et al. |
| 2004/0062206 A1 | 4/2004 | Soong et al. |
| 2004/0125775 A1 | 7/2004 | Rios |
| 2004/0131106 A1 | 7/2004 | Kanterakis |
| 2005/0009529 A1* | 1/2005 | Chen et al. .............. 455/450 |
| 2006/0246932 A1* | 11/2006 | Liang .................... 455/515 |
| 2007/0206544 A1* | 9/2007 | Varma .................... 370/337 |

\* cited by examiner

FIG. 1

UPCH method showing Ramp-Up, Acknowledgement, deferrence and packet transmission for two UEs.

FIG. 5
Timing Diagram Option of ACK packet.

FIG. 6
Showing the TDMA structure of the A-UPCH Channels for UPCH.

FIG. 7

Showing the CDMA structure of the A-UPCH Channels for UPCH.

FIG. 8
USICH Channel

DEFERRED ACCESS METHOD FOR UPLINK PACKET CHANNEL

RELATED APPLICATIONS

This application is a Continuation of U.S. application Ser. No. 12/965,361, filed on Dec. 10, 2010, now U.S. Pat. No. 8,873,478, which is a Continuation of U.S. application Ser. No. 12/233,176, filed on Sep. 18, 2008, now U.S. Pat. No. 7,869,404, which is a Continuation of U.S. application Ser. No. 10/935,236, filed Sep. 8, 2004, now U.S. Pat. No. 7,436,801, the entire contents of each of which are hereby incorporated by reference.

TECHNICAL FIELD

The present subject matter relates to techniques and equipment to improve access procedures, for allowing end user devices to access resources of a packet data communication network, typically, to allow transmission of one or more packets over a wireless uplink channel to a base station of such a network.

BACKGROUND

Recent developments in telecommunications technologies have allowed expansion of service offerings from the ubiquitous voice telephone service model to include an array of packet data communication services. Packet data service offerings are rapidly migrating from narrowband technologies to broadband technologies, to facilitate various multimedia applications. This evolution of data communication technologies has included a rapid development and deployment of wireless mobile communication networks. Carriers are now deploying wireless network technologies offering broadband packet data communication services. Packet data communication networks utilize various techniques to control access to or to allocate scarce network resources, such as packet communication channels in a wireless network.

Transmission deference is the notion of withholding the transmission of a packet over a network link until transmission conditions are more favorable for reliable data transfer. Since often a source output data rate cannot be controlled by the system, the generated data needs to be transmitted to its peer entity within a certain predetermined time window interval. Data being received outside this window often is discarded as useless. Other times, data delay constraints are rather relaxed. Data again has to be transmitted within some time period, but that period could be much longer than that of low delay constrained data. Part of the art in communicating is to relay all sorts of different delay constrained data concurrently at maximum throughput without violating the data delay constraints. Obtaining a high data throughput when operating with highly uncontrollable sources requires buffering and sophisticated transmission scheduling algorithms. Link or network resource allocation algorithms often perform highly complex optimization procedures in determining how to allocate link or network resources to different users. For long-term resource utilization, enough time must be available for collecting resource demands, processing them and then performing the resource allocation.

In highly centrally controlled networks, a centrally located controller controls resource allocation; and all data transmissions are scheduled in advance. When enough time is available for carrying out the underlying processes, these types of resource allocation mechanisms are highly effective and tend to maximize system throughput while providing the quality of service expected by the system users. Systems of this type are mostly seen when the performed services are low delay constrained, such as in voice or real time video applications. Here, strict delay constraints are imposed and enough system capacity is allocated to guarantee the required QoS. Since the time at which the voice or video connection is actually implemented in the network is not highly constrained, centrally located controllers have enough time to receive a request, process it, allocate the required network resource and inform the user that the resources have been allocated for use. Some form of central controllability provides a sense of system reliability; and unexpected or even catastrophic events can be dealt with efficiently and effectively within a short time interval. Service providers often negotiate contracts with their customers, which guarantee that events of this type either do not happen, or their effects are kept to a minimum.

Until now, real time services have been offered over networks, which would guarantee their required QoS. For other types of services, data networks operate in parallel to offer services not requiring low delay constraints. The best example of such a network is the Internet. Building and monitoring these different networks at all times is a huge cost, which translates to higher usage fees, albeit at the required QoS. The experience of the Internet so far is that services are not guaranteed. The resource allocation in these types of networks are more or less non-existent, and when the system is loaded, the delay could become very long thereby rendering certain applications unusable.

Other types of networks that have lately seen widespread use are local area networks (LANs) and in particular wireless local area networks (WLANs). Here the notion of resource allocation is associated with the end user device rather than a centrally located controller, although certain types of such networks do retain a level of central controllability. With the end user devices becoming more intelligent, resource management has become a more distributed oriented process. Clearly, allowing a fully distributed resource allocation does have considerable merits. For instance, a centrally located and expensive node to perform resource allocation is not required. Furthermore, the delay associated with data collection, processing and other resource management signaling functions is removed.

The differentiation of services does not stop at real time vs. non real time services. With the proliferation of electronic devices, a variety of different services requiring different QoS levels have been introduced. It is certainly not economically sensible to build a different network for each set of relatively dissimilar services. A merging of different types of services onto a single network platform is required.

Having a single network for all services imposes a major hurdle in the resource allocation requirements. A centrally controlled system cannot respond fast enough to accommodate changes in the network. Usage and scheduling a large number of users presenting bursty types of traffic greatly increases the amount of signaling and control overhead, sometimes to the point that the amount of overhead is more than the amount of the transmitted data itself. Furthermore, the signaling could be long enough to eliminate one of the biggest advantages of centrally controlled systems, which is the low delay constraint of guarantee.

A distributed control communication system can respond very fast in providing resources to different end points in a highly dynamic manner. End points are allowed to make their own measurements and decide about allocating (Capturing) a network resource for themselves. Clearly, the delay for resource allocation could be made very small; and there could be very little if any associated signaling overhead. Clearly, if a resource is not in use, an end point entity, which needs it, should not have to ask the network and wait for possibly a long time period to get a response back when the resource has been free all along.

Methods have been developed which tend to perform well over a large range of network types or mixture of service usage. Methods such as pure Aloha and slotted-Aloha are the pre-cursors of the large variety of methods that have been developed over the years. In pure-Aloha, an end point transmits whenever it has data. If the transmission collides with a transmission from another end point, the data is transmitted again until a successful transmission has occurred. There is minimal other signaling overhead required (besides the acknowledgment of successful transmission). The throughput of this method, however, is below 18%. This is clearly not a good system when the medium the system is communicating on is expensive. A slotted Aloha system maintains a time slot discipline, where a user transmits only at the beginning of a time slot and may hold the slot for its duration and beyond. The throughput of this approach is twice as much as for pure Aloha, but this gain is often not substantial enough to be attractive. Both Aloha types offer no sensing of the medium before transmission.

Methods like carrier sense multiple access (CSMA) require the end points to perform a carrier sense by which they can determine if the medium is already in use, before they themselves try to use it. CSMA being simple and effective has been popularized in various existing WLAN systems. It can operate without a central control node, and it only requires two end points to set up a functional network.

Fully distributed controlled systems, however, have the drawback that vital system resource and usage data are not available to all end points at all times. Each end point needs to operate based solely on the amount of information it can retrieve from sensing its environment. Having to operate with less and often minimal information, often places distributed control systems at a great disadvantage. Another major impairment is that of absorbability. In broadly physically distributed networks, end points cannot observe all medium activity over the full network. This limited absorbability could impose severe operational penalties to the overall system capacity. Methods such as RTS/CTS have been developed to deal with this problem often termed the "Hidden Node" problem.

Often systems need to retain a central controller. Since most small networks need to interact with other larger networks, through some gateway, this gateway is a natural location for a central network controller. Having a central controller could offer various advantages to a system that otherwise uses mostly distributed control to perform resource allocation. When a flavor of central control is imposed on a distributed functionality, capabilities otherwise difficult to obtain now become readily available. A semi-autonomous resource allocation could provide the fast speed of distributed (autonomous) systems and the reliability and information access of central control systems. Resource allocation methods of this type are founded for example in ISMA (Inhibit Sense Multiple Access) systems. Here, information is relayed from the network about the current use of the network resources. An end point is inhibited from accessing a resource that the network has declared as unavailable. The end points could contend for the idle or available resources in a distributed manner.

The issues behind Distributed vs. Centralized Resource Allocation in mobile networks could be itemized as follows: In Distributed networks, a) wireless end points control their transmission themselves, h) resource allocation processes (algorithms) are simple, c) transmissions are robust against other radio interference, d) ability to operate in ad-hoc networks or when channel is shared. In Centralized Network, a) a central controller as a Base Station is required, b) a Base Station schedules both Uplink and Downlink transmissions, c) better control over radio resources, d) better service guarantees such as (fairness, delay, loss, etc.) e) better suited to commercial systems such as cellular and GPRS.

SUMMARY

A need exists for a semi-autonomous dynamic resource allocation scheme to accommodate the different types of services requiring different levels of data delay constraints. In such a scheme, an accessing end point or end user device (UE) should not have to undergo another round of trying to access the network, which creates prolonged delays to the UE's transmitted data and consequently affects the overall quality of service offered by the Network. It would also be advantages to provide an effective mechanism by which the signaling overhead on the downlink from the network control node is minimized, while retaining the capability of assigning multiple resources to concurrently accessing UEs. As a starting point to address one or more of these needs, we will introduce the concept of a Deferred Acknowledgement (DACK) in the access procedure.

For example, a network node, such as a wireless base station, sends the DACK in response to an access request from a UE station telling the requesting station that the node has heard the request but that the requesting station should defer its transmission. The requesting station need not back off and re-initiate its access request. Instead, the requesting station waits for a later acknowledgement (ACK) granting access to a resource as requested. Although the DACK provides additional signaling, the amount of added overhead can be relatively small, so that this technique can still utilize a fast ACK type message, that is to say a relatively short signaling packet.

Implementation of the deferred acknowledgement type access procedure entails processing at the UE (e.g. in a mobile station) as well as processing at a network node (e.g. a base station or a radio network controller). Methods embodying such procedures therefore may be defined from the perspectives of end user devices, network nodes and/or an overall network operation.

Hence, one method might implement an access to a wireless communication network to transmit a data packet, and such a method example might begin with the transmission of a request message over-the-air to a node of the wireless communication network. The request message requests access to a resource of the network, for example, to allow a user's mobile station to transmit over an uplink channel of the wireless network. The method also entails receiving an acknowledgement message with a deferral instruction, and in response, deferring transmission of the data packet. A subsequently received acknowledgement message provides an instruction allowing access to the requested network resource, and in response, the data packet is transmitted over-the-air using the requested network resource.

Another method provides control of access to a wireless communication network for packet data communications, for example, for two requesting devices. The method involves receiving access request messages over-the-air from two end user communication devices. A first acknowledgement message is sent over-the-air to both devices. This first acknowledgement message comprises an acknowledgement of the access request message from the first device and a deferred acknowledgement for the second device. Following the first acknowledgement message, a packet data transmission is received over-the-air from the first end user communication device, via a wireless communication network resource requested by the first end user communication device. However, the second device defers its transmission. Subsequently, a second acknowledgement message is sent over-the-air to at least the second end user communication device. The second acknowledgement message includes an acknowledgement of the request message from the second end user communication device and effectively allows access by that device. Following the second acknowledgement message, the network receives a packet data transmission over-the-air from the second end user communication device, via a wireless communication network resource requested by that device.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

The various concepts disclosed herein relate to a new technique for resource allocation aid management, during an access procedure in a communication network. The method belongs to the class of semi-autonomous resource allocation methodologies and is mostly independent of technology or system configuration. When an end point tries to capture network resources and relies on either broader control parameters or network based information, it often fails to complete the process successfully. When this process requires network intervention, any interaction with the network could serve as a useful resource for future end-point to network interaction. One possible way is for the network to acknowledge reception of the request and signal the end-point that its request will be served at a later time under a previously well-defined manner. In a sense, network resource allocation has been "deferred" to a later time and the network is bound to take further action in completing the resource allocation process.

It is noted that the term "Deference" has been used in describing wireless networks to signify access contention at a later 'deferred' time. For example, in CSMA/CA (Carrier Sense/Multiple Access/Collision Avoidance), the end point might defer access of the medium to a later time if the medium has been determined to be presently occupied. The deference time is normally obtained by choosing a time instant at random out of a set of time instances within a time window following the last access attempt. Such existing wireless network "deferred" access mechanisms, however, are very different from the one disclosed here.

Operations here involve the introduction of a Deferred Acknowledgement (DACK) message, sent from the controlling network node (B), during the access procedure. In response, the end point (or user end UE) device will wait for the next signaling, at which time it may receive an acknowledgement or another Deferred Acknowledgement. The deferral here does not necessarily guarantee that network resources will in fact be allocated, rather if they do become available and other conditions are satisfied, (such as class priority, etc.) then the resource will be either allocated or declined. The method will be referred as Deferred Time Channel Assignment (DTCA) method. The method takes the distinction of assignment because the network could either allocate the resource requested by the end point or assign a similar resource, which could serve for the same purpose.

A number of access requests can be acknowledged at the same time (via the same acknowledgement packet). Some accesses may be scheduled immediately while others may be deferred to be scheduled at the next or a later scheduling instance. The Acknowledgement could come in the form of a single unique identifier for a specific ongoing access attempt. The ACK may include additional information specifying the identification of the access attempt as well as providing information with respect to when (time) that the UE station should transmit the packet, the channel to be used for the transmission (i.e., Channelization code along with time slots if necessary), power control information, time alignment information, etc.

Various different options could be applicable to the deference mechanism proposed here. For example, the list of scheduled and deferred signatures might be updated in every transmission of the ACK packet (FS-UPCH). Deferred UEs do not transmit until scheduled or their deference becomes outdated, i.e., the T_def_max timer is expired.

The deferred acknowledgement could utilize an Uplink Status Indicator Channel (USICH). The USICH is a channel which signals the UEs about the status of the uplink packet channels ("UPCH" channels). USICH is transmitted periodically. Information that may be relayed over the USICH channel might include current activity or inactivity of all UPCH channels. A binary indicator for each channel shall suffice in this case. The USICH may also carry information regarding the largest capacity channel available. UPCH channels might be grouped in sets of channels having the same transmission capabilities, in which case, the USICH would carry information about the sets rather than the individual channels.

Another option would be for the UEs to monitor the deferred channel signatures and refrain from using the corresponding channels unless they are scheduled, have become outdated or USICH has declared them as idle. Another approach is for the deferred UEs to attempt to re-access on the same code at the immediately next opportunity. In this later case, other UEs refrain from using the same signature, and deferred UEs need not increase their transmit power.

The methodology, although general in its scope, will be described by way of example in the context of cellular wireless communications, where the network controller could be located in the Base Station, the Radio Network Controller or elsewhere on the network. In such an example, the end-points are the wireless user devices distributed geographically over a possibly large area. In conjunction with the DTCA mechanism, other processes and structures will play a contributing role in performing the sought resource allocation.

Figure 1:
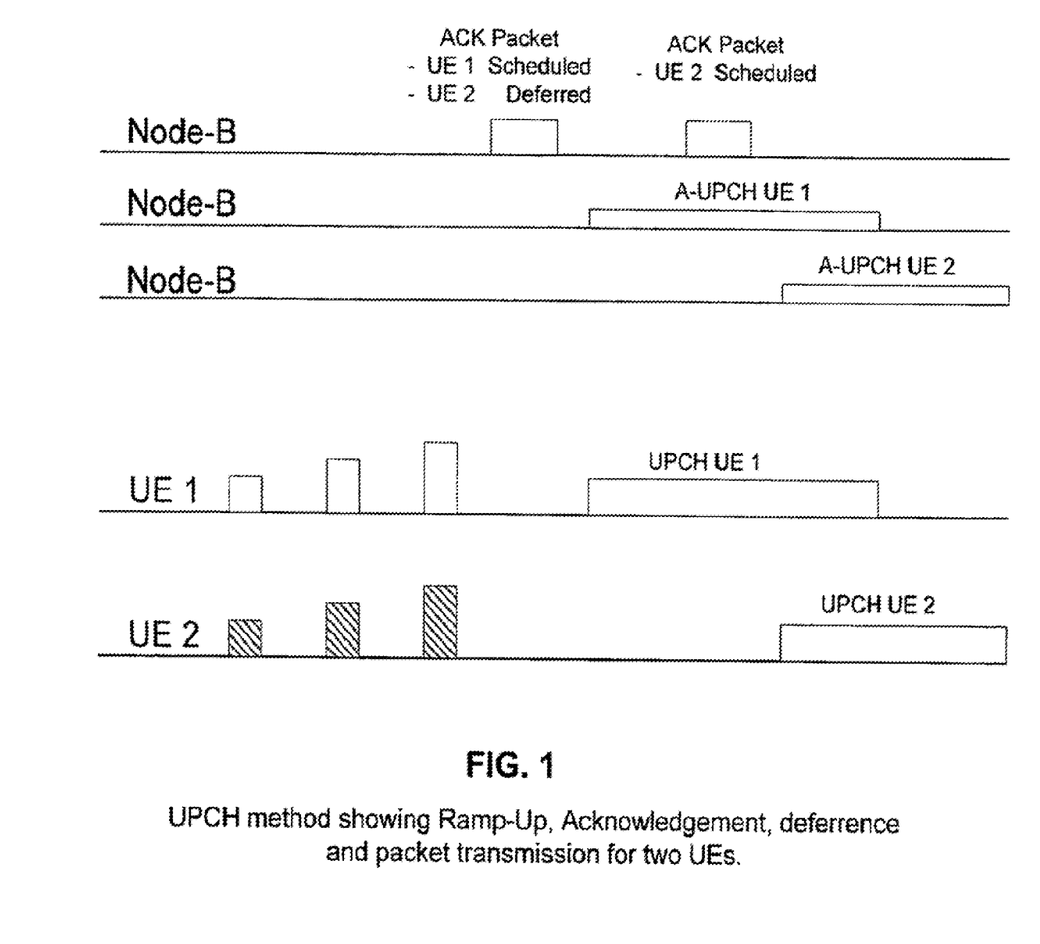
FIG. 1 is a signal flow diagram useful in explaining an example of an access procedure utilizing a deferred acknowledgement.

Reference now is made in detail to the examples illustrated in the accompanying drawings and discussed below. FIG. 1 illustrates the principle of deferred acknowledgement, in accord with the present concepts. As shown in that simplified example, for wireless communications, the network provides three downlink (DL) channels and two uplink (UL) channels. The two uplink channels are transmitted by UE1 and UE2, respectively. All three downlink channels are transmitted from the same Node-B. One of the DL channels serves as an acknowledgement/assignment channel, and the other two DL channels serve as data/control channels allocated for transmission to respective UEs.

Here, the two UEs on the uplink both initiate an access phase at the same time. During the access phase, each UE starts transmitting over the respective uplink channel at a power level, which depends on its distance from Node-B, other statistical factors and various preset systems parameters. Each UE sends a series of preamble segments, which transmitted at increasing power levels. Each UE device continues this ramp-up of preamble segment transmission until it reaches a preamble power level that is detectable by Node-B, and Node-B has notified the transmitting UE that its transmitted preamble has been detected.

In FIG. 1, preamble segments from both UE1 and UE2 are detected at approximately the same time. Assuming the two UEs are transmitting different preambles, Node-B could distinctly identify their two transmissions. Borrowing from currently existing UMTS access technologies, such as random access channel (RACH) and common packet channel (CPCH), the different preambles signify certain channel access requests, whose correspondence has been previously relayed to the UEs by the network. If the access requests by the two UEs are for resources that are currently available, and the DL scheduling message (denoted here as an ACK Packet) is capable of handling the assignment of multiple UEs at the same time, Node-B could provide both the assignments concurrently and wait for the next access request.

Problems arise, however, when the resources are not available and/or the second node (B) does not have the capability to allocate multiple resources at the same time. The concurrent assignment of multiple resources requires that enough signaling bandwidth (which translates to system capacity) needs to be allocated beforehand and not to be used for any other purpose. Clearly if the concurrent assignment of resources does not happen very often, useful downlink resources will be wasted. Furthermore, if the requested resources are not immediately available, resource assignment cannot happen at all. The deferred acknowledgement technique ameliorates these problems by providing a mechanism by which the Node B can assign resources to one UE and provide a deferral notice to the other UE. A further benefit of deference is that an accessing UE instructed to defer access will not have to undergo another round of trying to access the network, which otherwise would create prolonged delays to the UE's transmitted data and consequently affect the overall quality of service offered by the network.

A mechanism by which the signaling overhead on the DL is minimized while retaining the capability of assigning multiple resources to concurrently accessing UEs is disclosed here, which streamlines the channel assignment mechanism. The required signaling overheard can be kept low by requiring different UEs to receive channel assignments at possibly different times. A dynamic process will control which UE will be assigned which channel and at what time. This process is interactive, between the UEs and Node-B.

In the example of FIG. 1, upon detecting the access requests by the two UEs, Node B determines how to allocate resources. In the example, assume that Node B selects UE 1 to receive an immediate channel allocation, therefore the request from UE 2 is to be deferred. Node B can use any appropriate algorithm to determine these respective assignments. Node B transmits an ACK packet over the first downlink channel. ACK packets can be transmitted using Multi-codes (Orthogonal Parallel Codes) and multiple time slots. Of course, the ACK packets may be transmitted in other suitable ways over the channelization used on the particular network. The transmitted ACK packet includes an ACK for the granted access request, in this case providing the information for scheduling and/or enabling the access requested by UE 1. The transmitted ACK packet also includes a deferred acknowledgement (DACK) message for UE 2, effectively informing UE 2 that Node B heard its access request but instructing UE 2 to defer transmission.

At a predetermined time after the ACK packet transmission (and thus after the ACK to UE 1), the network element Node B transmits signaling and/or data intended for the first end user device UE 1 over the assigned downlink channel, as shown in the second line of the signal flow diagram. In response to the ACK message scheduling access, the first end user device UE 1 initiates its data transmission over the appropriate uplink channel, as shown in the fourth line, of the signal flow diagram. However, in response to the DACK it received, the other end user device UE 2, waits for a further ACK packet transmission.

In the simple example of FIG. 1, when the next time for an ACK packet arrives, although it is engaged in communications to/from UE 1, the network element at Node B has only one unsatisfied access request pending. Since sufficient resources are available to satisfy the request from UE 2, Node B allocates those resources and sends an ACK message containing scheduling information or the like for UE 2 in the second ACK packet transmission. At a predetermined time after the second ACK packet transmission (and thus after the ACK to UE 2), the network element Node B transmits signaling and/or data intended for end user device UE 2 over the assigned downlink channel, as shown in the third line of the signal flow diagram. In response to the second ACK message scheduling access, the second end user device UE 2 initiates its data transmission over the appropriate uplink channel, as shown in the fifth line of the signal flow diagram. In this manner, transmissions over the uplink packet channel (UPCH) occur in predetermined time slots. Synchronization, is derived from downlink-transmitted signals.

As shown, a fast Acknowledgement (e.g. first ACK packet) stops the Power Ramp-Up during the access phase, and a number of Ramp-Up access requests can be acknowledged at the same time (over the same acknowledgement packet). Some accesses may be scheduled immediately while others may be deferred to be scheduled at the next or a later scheduling instance.

The Acknowledgement could come in the form of a single unique identifier for a specific ongoing ramp-up access. The ACK may include additional information specifying the identification of the access attempt as well as providing information with respect to when (time) that the mobile station should transmit the packet, the channel to be used for the transmission (i.e., Channelization code along with time slots if necessary), power control information, time alignment information, etc.

The order of deference may be relayed in the scheduling message (Acknowledgement Packet). For example, when three UPCH accesses are acknowledged at the same time, Acknowledged access A could be scheduled immediately, Acknowledged Access B the next scheduling instance, and Acknowledged Access C the scheduling instance following that of Acknowledged Access B. The scheduling order could be relayed in different ways. A simple way of doing that is to relay the order by the order they are acknowledged in time. If that is not possible, in case of multiple codes being used, system information will be used to resolve any ambiguities.

The deferral procedures outlined above may be implemented in a variety of wireless networks. For discussion purposes, the examples assume implementation in a cellular wireless network supporting packet communications of digital data or other forms of digital information. To better appreciate such an implementation, it may be helpful to consider an example of such a network.

Figure 2:
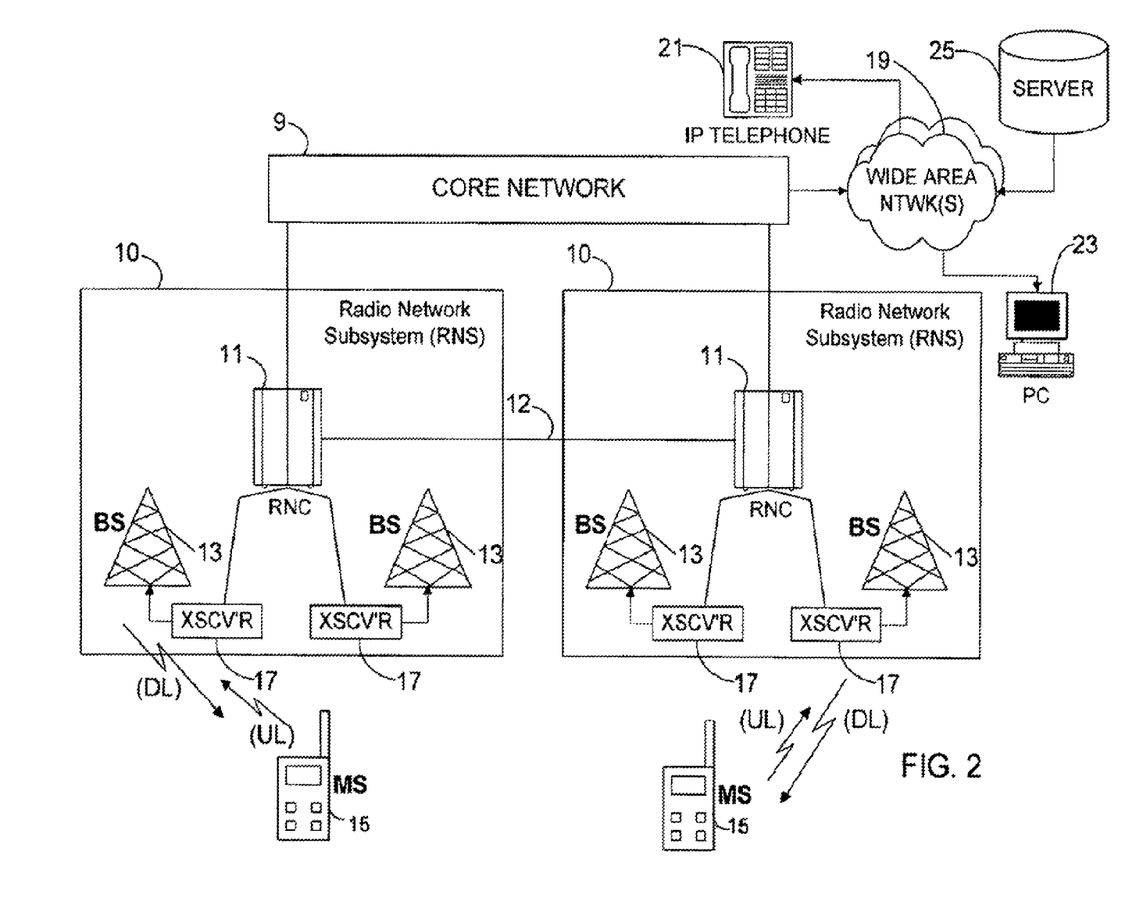
FIG. 2 is a functional block diagram of a simplified code-division-multiple-access (CDMA) Terrestrial Radio Access Network architecture, which may utilize the deferred acknowledgement technique.

In a representative wireless network example (FIG. 2), the code-division-multiple-access (CDMA) system comprises a radio network controller (RNC) 11, a plurality of base stations 13 and a plurality of mobile stations 15. In this example, Node B is implemented by one or another of the network elements, whereas the mobile stations 15 are the UEs. FIG. 2 shows a simplified CDMA Terrestrial Radio Access network architecture. The illustrated system includes a core network 9 providing two-way packet data communications to and from a plurality of radio network subsystems (RNSs) 10. Each RNS 10 includes a radio network controller (RNC) 11 and a number of base stations (BSs) 13 connected to the respective RNC 11. The RNCs 11 of several radio network subsystems 10 may be interconnected, for example by the line 12. The resource allocation functionality of Node B may be implemented in the RNC 11 or in controllers (not separately shown in FIG. 2) implemented at the base stations 13.

Each base station (BS) 13 has a BS-spread-spectrum transmitter and a BS-spread-spectrum receiver, shown as a single transceiver (XSCV'R) system 17 for simplicity in this drawing. Each of the mobile stations (MS) 15 has an MS-spread-spectrum transmitter and an MS-spread-spectrum receiver (not separately shown). Exemplary transmitters and receivers for use in the BS and MS network elements are discussed in more detail below, with regard to FIGS. 3 and 4. The transceivers 17 and associated antennas at the base stations, together with the transceivers and antennas in the mobile stations, provide the two-way signaling and data communications over the air-link, such as those shown in FIG. 1.

In a typical embodiment, the radio network controller (RNC) 11 and core network 9 provide two-way packet data communications to one or more wide area networks 19, for example a wide area packet-switched network such as an intranet or the pubic Internet. The RNC 11 and the network 19 provide the MS units 15 with two-way packet data communications services to enable communication to and from devices, represented by way of example by the IP telephone 21, the personal computer (PC) 23 and the server 25.

The CDMA type spread-spectrum system of FIG. 2 provides a number of logically different channels for upstream and downstream communications over the air-link interface. Each channel is defined by one or more of the codes, for example the spreading code and/or the scrambling code. Several of the channels are common channels, but most of the channels are used for uplink or downlink packet communications between the base stations 13 and the mobile stations 15.

The RNC 11 measures traffic through the base stations 13 going to and from the mobile stations 15. In this way, the radio network controller (RNC) 11 monitors traffic demand in the illustrated network. The RNC 11 assigns physical channel resources to the mobile stations 15, by re-configuring the state of a packet data connected mode of each mobile station 15 within each cell of each base station 13.

In the wireless system of FIG. 2, when a mobile station 15 initiates an access request procedure (e.g. a RACH access), the serving base station 13 can either send back an acknowledgement (ACK), a negative acknowledgement (NACK), or the new Deferred Acknowledgement (DACK). If the mobile station 15 receives an ACK, it will go ahead with the normal process to send its data over the uplink. If the mobile station 15 receives a NACK, it will back off and restart the access request procedure again. The ACK and NACK operations are essentially performed as in existing proposals for 3G and 4G type wireless networks. In the present procedure, however, the mobile station 15 may also receive the DACK. The DACK message informs the mobile station 15 that the station's access request was received, and it serves to instruct the mobile station to wait for the next round of signaling, for another acknowledgement/assignment instruction. The mobile station 15 will neither send its data nor back off. Instead, it will wait for the next acknowledgement/assignment signaling packet. The mobile station 15 will repeat this decision process again based on the kind of acknowledgement (ACK, NACK or DACK) it receives in the next round.

From the base station side, the base station 15 (or other network node, such as the RNC 11) will keep a list of outstanding requests, for example as a waiting list, in an ordered manner. The ordering can be based on the priority of the service requested, on a first come first serve basis, or any other basis the system or system operator deems appropriate. When channel resources become available for use, the base station 15 will notify the waiting, mobile station 15 to access that resource, by sending the appropriate ACK to that station 15 over the downlink signaling channel. The ordered list can be broadcast in every ACK signaling phase.

It is assumed that those skilled in the art are familiar with the structure and operation of various devices and systems that may serve as the network elements illustrated in FIG. 2. However, to insure a full understanding of how one might implement the deferred acknowledgement methodology in an actual wireless network, it may be helpful to briefly summarize examples of the wireless transceiver elements of a base station and a mobile station, which might be used to send and receive the relevant signaling and data over the wireless air interface.

Figure 3:
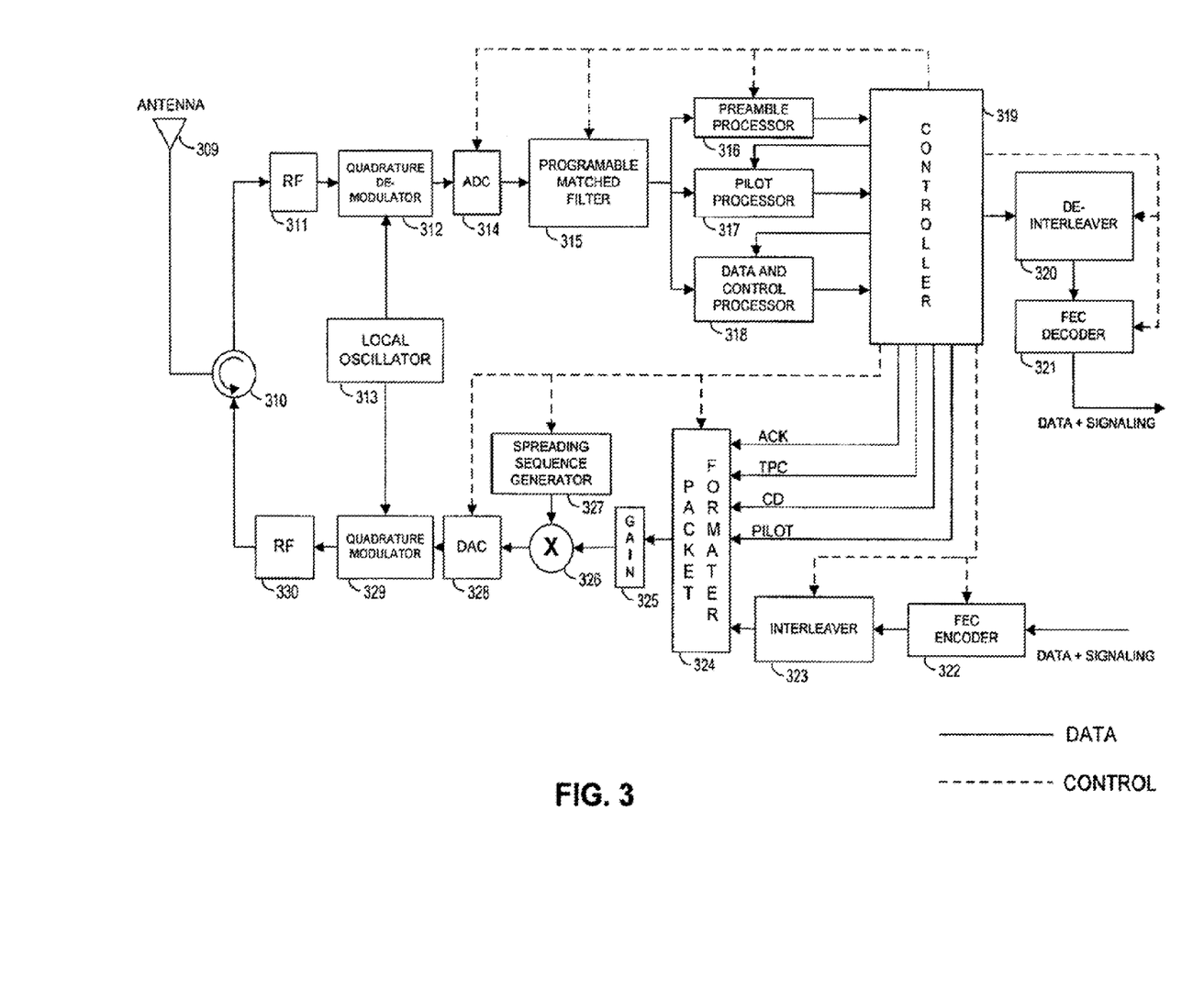
FIG. 3 is a functional block diagram of a spread spectrum base station for use in a network of the type shown in FIG. 2.

FIG. 3 illustrates an example of a BS spread-spectrum transmitter and a BS spread-spectrum receiver, essentially in the form of a base-band processor for performing the PHY layer functions. The BS spread-spectrum transmitter and the BS spread-spectrum receiver form one of the transceivers 17 at a base station 13. The BS spread-spectrum receiver includes an antenna 309 coupled to a circulator 310, a receiver radio frequency (RF) section 311, a local oscillator 313, a quadrature demodulator 312, and an analog-to-digital converter 314. The receiver RF section 311 is coupled between the circulator 310 and the quadrature demodulator 312. The quadrature demodulator is coupled to the local oscillator 313 and to the analog to digital converter 314. The output of the analog-to-digital converter 315 is coupled to a programmable-matched filter 315.

A preamble processor 316, pilot processor 317 and data-and-control processor 318 are coupled to the programmable-matched filter 315. A controller 319 is coupled to the preamble processor 316, pilot processor 317 and data-and-control processor 318. A de-interleaver 320 is coupled between the controller 319 and a forward-error-correction (FEC) decoder 321. The decoder 321 outputs data and signaling received via any of the UL channels to the media access control "MAC" layer (not shown).

The BS spread-spectrum transmitter includes a forward-error-correction (FEC) encoder 322 coupled to an interleaver 323. A packet formatter 324 is coupled to the interleaver 323 and to the controller 319. A variable gain device 325 is coupled between the packet formatter 324 and a product device 326. A spreading-sequence generator 327 is coupled to the product device 326. A digital-to-analog converter 328 is coupled between the product device 328 and quadrature modulator 329. The quadrature modulator 329 is coupled to the local oscillator 313 and a transmitter RF section 330. The transmitter RF section 330 is coupled to the circulator 310.

The controller 319 has control links coupled to the analog-to-digital converter 314, the programmable-matched filter 315, the preamble processor 316, the digital-to-analog converter 328, the spreading sequence generator 327, the variable gain device 325, the packet formatter 324, the de-interleaver 320, the FEC decoder 321, the interleaver 323 and the FEC encoder 322.

These functions are well known in the art, and variations to this block diagram can accomplish the same functions.

A received spread-spectrum signal from antenna 309 passes through circulator 310 and is amplified and filtered by the receiver RE section 311. The local oscillator 313 generates a local signal, which the quadrature demodulator 312 uses to demodulate in-phase and quadrature phase components of the received spread-spectrum signal. The analog-to-digital converter 314 converts the in-phase component and the quadrature-phase component to digital signals. The programmable-matched filter 315 despreads the received spread-spectrum signal components. A correlator, as an alternative, may be used as an equivalent means for despeading the received spread-spectrum signal.

The preamble processor 316 detects a preamble portion of the received spread-spectrum signal. The pilot processor 317 detects and synchronizes to a pilot portion of the received spread-spectrum signal. The data and control processor 318 detects and processes the data portion of the received spread-spectrum signal. Detected data passes through the controller 319 to the de-interleaver 320 and FEC decoder 321. Data and signaling from the uplink are outputted from the FEC decoder 321 to the higher layer elements in or associated with the BS 13 and through the link to the RNC 11.

The RNC 11 supplies data and signaling over a link to the base station. In the BS transceiver, the MAC layer elements supply data and signaling information, intended for downlink transmission, to the input of the FEC encoder 322. The signaling and data are FEC encoded by the FEC encoder 322, and interleaved by the interleaver 323. The packet formatter 324 formats data, signaling, acknowledgment signal, collision detection signal, pilot signal and transmitting power control (TPC) signal into appropriate packets. Each packet is outputted from the packet formatter 324, and the packet level is amplified or attenuated by the variable gain device 325. The packet is spread-spectrum processed by the product device 326, with a spreading chip-sequence from the spreading-sequence generator 327. The packet is converted to an analog signal by the digital-to-analog converter 328, and in-phase and quadrature-phase components are generated by the quadrature modulator 329 using, a signal from local oscillator 313. The modulated down-link packet is translated to a carrier frequency, filtered and amplified by the transmitter RF section 330, and then it passes through the circulator 310 and is radiated by antenna 309.

Figure 4:
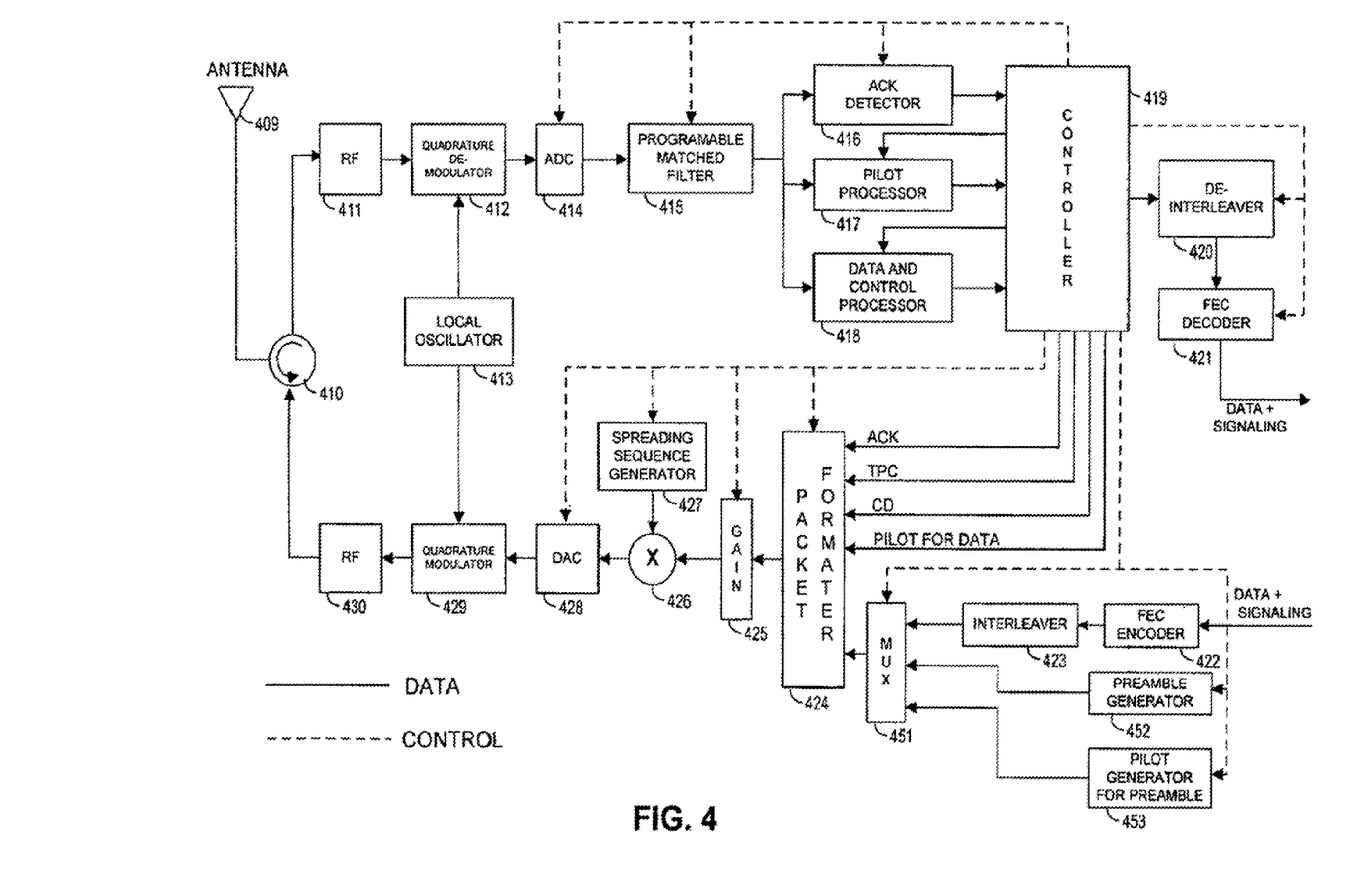
FIG. 4 is a functional block diagram of a spread spectrum remote or mobile station for use as a UE device in a network of the type shown in FIG. 2.

FIG. 4 shows an example of an MS spread-spectrum transmitter and an MS spread-spectrum receiver, essentially in the form of a base-band processor for performing the PHY layer transceiver functions of an end user device. The MS spread-spectrum transmitter and the MS spread-spectrum receiver are located at the remote or mobile station (MS) 15. The MS spread-spectrum receiver includes an antenna 409 coupled to a circulator 410, a receiver radio frequency (RE) section 411, a local oscillator 413, a quadrature demodulator 412, and an analog-to-digital converter 414. The receiver RE section 411 is coupled between the circulator 410 and the quadrature demodulator 412. The quadrature demodulator is coupled to the local oscillator 413 and to the analog to digital converter 414. The output of the analog-to-digital converter 415 is coupled to a programmable-matched filter 415.

An acknowledgment detector 416, pilot processor 417 and data-and-control processor 418 are coupled to the programmable-matched filter 415. A controller 419 is coupled to the acknowledgment detector 416, pilot processor 417 and data-and-control processor 418. A de-interleaver 420 is coupled between the controller 419 and a forward-error-correction (FEC) decoder 421. The decoder 421 outputs data and signaling received via any of the DL channels to the MAC layer elements (not shown) of the MS.

The MS spread-spectrum transmitter includes a forward-error-correction (FEC) encoder 422 coupled to an interleaver 423. A packet formatter 424 is coupled through a multiplexer 451 to the interleaver 423. The packet formatter 424 also is coupled to the controller 419. A preamble generator 452 and a pilot generator 453 are coupled to the multiplexer 451. A variable gain device 425 is coupled between the packet formatter 424 and a product device 426. A spreading-sequence generator 427 is coupled to the product device 426. A digital-to-analog converter 428 is coupled between the product device 428 and quadrature modulator 429. The quadrature modulator 429 is coupled to the local oscillator 413 and a transmitter RE section 430. The transmitter RF section 430 is coupled to the circulator 410.

The controller 419 has control links coupled to the analog-to-digital converter 414, the programmable-matched filter 415, the acknowledgment detector 416, the digital-to-analog converter 428, the spreading sequence generator 427, the variable gain device 425, the packet formatter 424, the de-interleaver 420, the FEC decoder 421, the interleaver 423, the FEC encoder 422, the preamble generator 452 and the pilot generator 453.

These functions are well known in the art, and variations to this block diagram can accomplish the same functions.

A received spread-spectrum signal from antenna 409 passes through circulator 410 and is amplified and filtered by the receiver RE section 411. The local oscillator 413 generates a local signal, which the quadrature demodulator 412 uses to demodulate in-phase and quadrature phase components of the received spread-spectrum signal. The analog-to-digital converter 414 converts the in-phase component and the quadrature-phase component to digital signals. The programmable-matched filter 415 despreads the received spread-spectrum signal components A correlator, as an alternative, may be used as an equivalent means for despeading the received spread-spectrum signal.

The acknowledgment detector 416 detects certain acknowledgments in the received spread-spectrum signal. The pilot processor 417 detects and synchronizes to a pilot portion of the received spread-spectrum signal. The data and control processor 418 detects and processes the data portion of the received spread-spectrum signal. Detected data passes through the controller 419 to the de-interleaver 420 and FEC decoder 421. Data and signaling from the DL are outputted from the FEC decoder 421 to the higher level elements in or associated with the MS 15.

In the MS transceiver, the MAC layer elements supply data and signaling information intended for transmission over the up-link channel, to the input of the FEC encoder 422. Data and signaling information are FEC encoded by FEC encoder 422, and interleaved by interleaver 423. The preamble generator 452 generates a preamble, and the pilot generator 453 generates a pilot for the preamble. The multiplexer 451 multiplexes the data, preamble and pilot, and the packet formatter 424 formats the preamble, pilot and data into a common-packet channel packet. Further, the packet formatter 424 formats data, signaling, acknowledgment signal, collision detection signal, pilot signal and TPC signal into a packet. The packet formatter 424 outputs the packet, and the packet level is amplified or attenuated by variable gain device 425. The packet is spread-spectrum processed by product device 426, with a spreading chip-sequence from spreading-sequence generator 427. The packet is converted to an analog signal by digital-to-analog converter 428, and quadrature modulator 429 using a signal from local oscillator 413 generates in-phase and quadrature-phase components. The modulated uplink packet is translated to a carrier frequency, filtered and amplified by the transmitter RF section 430 and then it passes through the circulator 430 and is radiated by the antenna 409.

U.S. Pat. No. 6,169,759 to Kanterakis et al. issued Jan. 2, 2001 provides a more detailed description of the operation of the PHY transceivers shown in FIGS. 3 and 4, for example in a CPCH type channel transmission.

The uplink packet channel (UPCH), proposed here with the deferred acknowledgement, may be implemented in a manner somewhat similar to or as an enhancement to the RACH channel in the 1.28 Mcps TDD option of 3GPP. The UPCH may utilize the same type of channels as in the RACH but these channels are expanded if necessary to accommodate additional information transfer as needed. It is the intent of such an implementation to remain as close to the operational requirements of RACH as possible, but incorporate new functionalities to enhance system access capabilities and system data transfer capacity. The new channel construct will be designed to accommodate the efficient transfer of small to medium size packets on the Uplink. The delimiter of when to use a dedicated channel (DCH) when the packet to be transferred is large will be an adjustable system parameter.

It is proposed that the UpPCH channel will still be used as an Uplink Preamble/Pilot-Tone transmission and the FPACH as the channel for signaling the UE's the preamble detection events at Node-B and scheduling information control.

There are two main alternatives in carrying out the proposed functionality. The first alternative is to retain the same exact capabilities offered by the current UpPCH and FPACH but use the extra-unused bits in FPACH to perform some of the proposed functionalities. The resources will need to be shared between the RACH and UPCH. This will require that the UpPCH pilot-tones be shared between the RACH and UPCH on the uplink, and the FPACH will need to be time-multiplexed between RACH and UPCH. The extra bits in FPACH could be used by UPCH in the RACH time slot as well. We will call this channel FS-UPCH for Forward Signaling UPCH. The load requirements of RACH would be reduced since UPCH will take off some of the RACH load. It should be possible to eliminate RACH without substantial reduction in system performance.

The other alternative is to split the UpPCH resources between RACH and UPCH or redesign the UpPCH to include additional codes which then could be shared by RACH and UPCH. On the DL, an additional FPACH channel, call it again FS-UPCH, will be added to accommodate the DL signaling required for UPCH. This channel could be easily incorporated into the system by code multiplexing more channels, preferably in the same time slot as the current FPACH. The extra resources in FPACH need not necessarily be used.

For both of the above alternatives, we propose that Closed Loop Power Control (CLPC) is used during the packet data transfer portion of UPCH. Additional signaling during the data transmission interval will be described later. Additional Associated UPCH (A-UPCH) physical channels will be needed on the DL to accommodate the proposed CLPC and other required DL signaling for the UPCH channels. A signaling channel dedicated to signal the UPCH channel availability and minimum spreading factor available for UPCH is proposed. This channel will be referred here as USICH for Uplink Signaling Indicator Channel. This channel is similar in concept to that of CPCH in the FDD mode.

The methodology or protocol for resource access, using the deferred acknowledgement technique, is implemented by elements in the mobile station and elements in the network. The control element in the mobile station may be the controller 419 in the baseband processor (FIG. 4) forming the mobile station transceiver or the control element may be a programmed processor (in the MAC or higher level element) in the mobile station. The control element on the network side may be the controller 319 in the baseband processor (FIG. 4) forming the base station transceiver 17 a programmed processor (higher level element) in the base station 13 or a processor of the radio network controller 11.

It may be helpful to consider a first example of a deferred acknowledgement type access procedure, as might be implemented using equipment such as shown in FIGS. 2-4. First a mobile station 15 randomly selects a preamble, which represents a sub-channel from a set of pre-allocated common channels and sends its access request. The access request can be in the form of random access channel (RACH) with ramp-up, as in the example of FIG. 1, or in any other form. Upon receiving the access request, the base station 13 (or other element serving as Node B) examines the current usage of the requested channel. The base station 13 will send out: an ACK if the channel is available, a DACK if the base station keeps the request on its waiting list, or a NACK if it cannot accommodate the request in the near future. The ACK, NACK and DACK can correspond to the selected preamble (resource type requested) rather than being specific to each mobile station 15. Depending on the system, these messages may also correspond to a specific mobile station if the access request contains, an ID of the transmitting mobile station 15.

If the mobile station receives an ACK, it will go ahead to send its data over the uplink channel corresponding to the selected preamble. If the mobile station receives no acknowledgement or a "NACK," it will back off and restart the access request procedure again at a later time. If the mobile station receives a DACK, it will neither send its data nor back off. Instead, it will wait for the next acknowledgement phase. The mobile station will repeat this decision process again based on the kind of acknowledgement it receives in the next round.

This is essentially the operation performed by the second end user device (UE 2) in the flow of FIG. 1.

During Ramp-Up, the utilized preamble signatures could be changed when the signatures do not alter the type of requested UPCH channel. Channel type shall pertain to UPCH channels according to their set classification.

Figure 5:
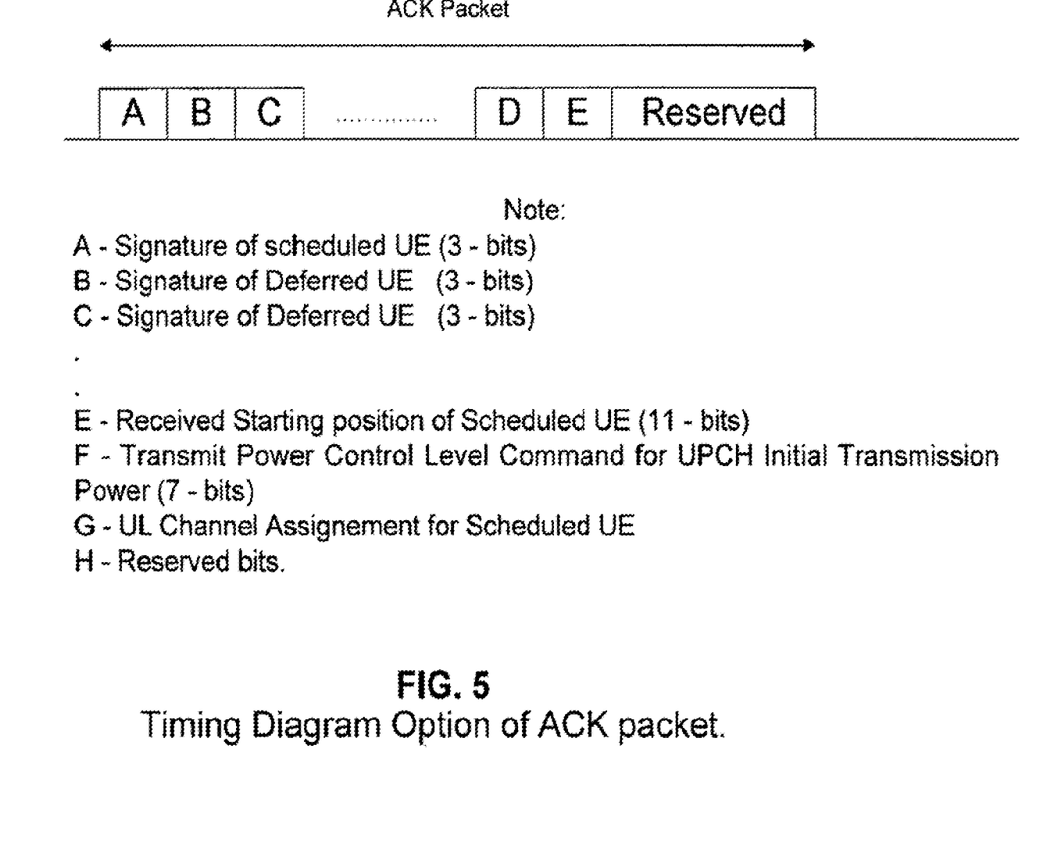
FIG. 5 is a timing diagram of an exemplary acknowledgement packet.

As another example, assume an ACK Packet is as shown in FIG. 5. Here, a single UE can be assigned a resource each time an ACK-Packet is transmitted. In particular, a number of UEs can be acknowledged at the same time but only one of them can be assigned a resource. Location A on this figure holds the signature of the UEs to be allocated a resource, while locations B and C hold the signatures of UEs to be allocated a resource at a later time when another such ACK Packet is transmitted. The placement order of the different UE signatures in time could signify which UE will be assigned at what instant and the remaining ones later.

Locations E, F and G are locations, which hold signaling information for the scheduled UE access. This signaling information could be much more in comparison to the information required to transmit a single UE signature. For example, the scheduling message could hold the time location of the start of the assigned resource at some time within the next few time frame periods to within a small fraction of a transmitted symbol. In CDMA, transmitted symbols could be taken to be chips, which will require timing accuracies to within a small fraction of a chip. This time assignment is made in reference to the scheduled UEs current timing reception at Node-B, which in essence provides a timing alignment of the Uplink channel to be used by the assigned UE. Other signaling, such as signaling as to which channel to use and at what power level to transmit at could also be relayed to the scheduled UE.

In case there are only two UEs to be scheduled, as shown in FIG. 1, UE 1 could be scheduled with a first ACK-Packet and UE 2 with the second ACK-Packet. Here it is shown that UE 2 ceases to transmit additional preambles once it's been ACKed. It is left here as an option by which UE2 could continue to transmit preambles at the same or a lower rate of increase of it's power until the ACK-Packet at which it will be scheduled will arrive. It is possible for the deferred UE to remain in this state for a number of received ACK-Packets before it is scheduled to actually transmit via an assigned/requested resource. Having started accessing first does not guarantee being assigned first. This can easily be done through Node-B by manipulating the time order of the UE's transmitted signatures. As an aside, a UE signature for the purpose of this discussion is the preamble signature used by the UE.

The proposed method could operate on either open or closed loop power control. When using open loop power control, the transmitting UEs initially set their power levels through some predetermined mechanism and then they can adjust their transmitting power levels only by sensing the power level of the downlink signals. In TDD systems, open loop power control is a better option than it is for FDD systems. Because the same frequency channel is used for both uplink and downlink transmissions, the power change on the downlink provides a good measure of the power change on the uplink. Here it is the preferred option that closed loop power control is used for UPCH, which may necessitate use of a dedicated associated DL channel to support Uplink Power Control. Each transmitting UE is assigned a downlink channel, which serves for controlling the power of the uplink transmissions (see e.g. FIG. 1).

A further functionality of this associated downlink control channel will be to provide synchronization adjustments through the SYNC portion of the transmission as well as other signaling control information, such as a Start of Message Indicator (SMI) and End of Transmission (EOT). The SYNC signaling will allow uplink transmissions of different UPCH channels to arrive at Node-B in a synchronous manner. This could then be used to make different UPCH transmission to be orthogonal to each other by the use of orthogonal codes or symbols. Note that orthogonality here is dependent on the amount and severity of the multipath channels the UEs are operating upon. The functionality of SMI and EOT signaling is the same as for existing CPCH communications. Because the amount of signaling carried by an associated UPCH channel is relatively small, many associated CPCH channels could be transmitted during a single frame. Each of these associated UPCHs is for controlling a different transmitting UE.

Figure 6:
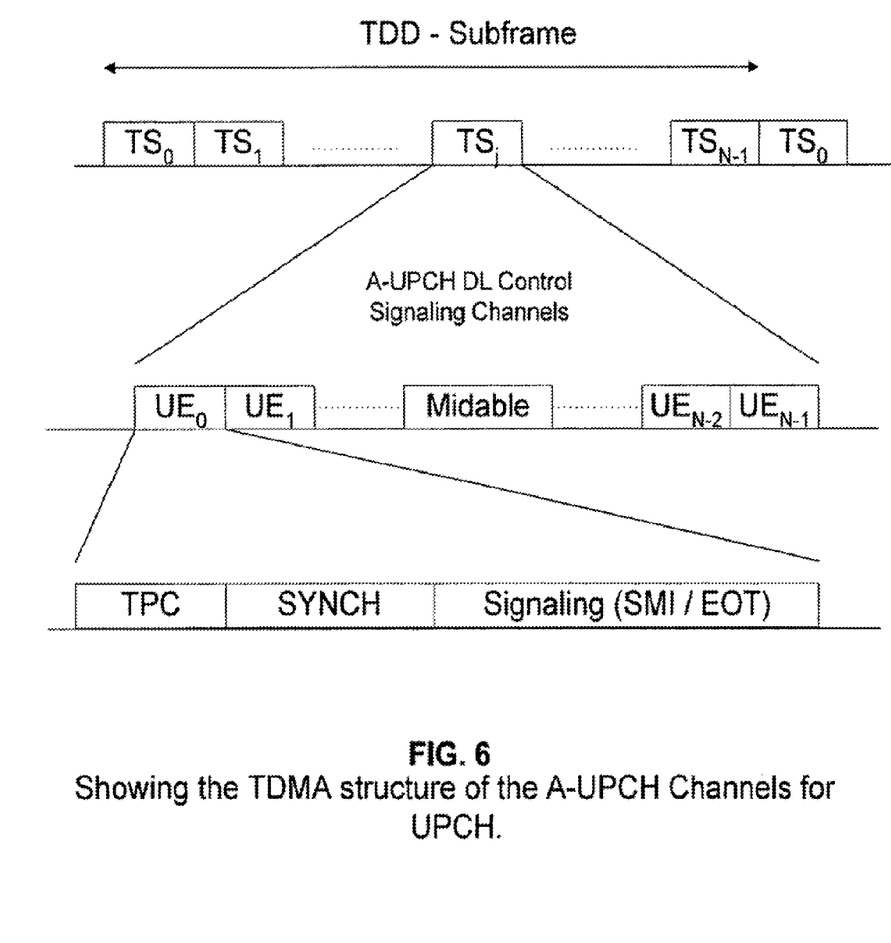
FIG. 6 illustrates a time division multiple access structure for an uplink packet channel (UPCH).
Figure 7:
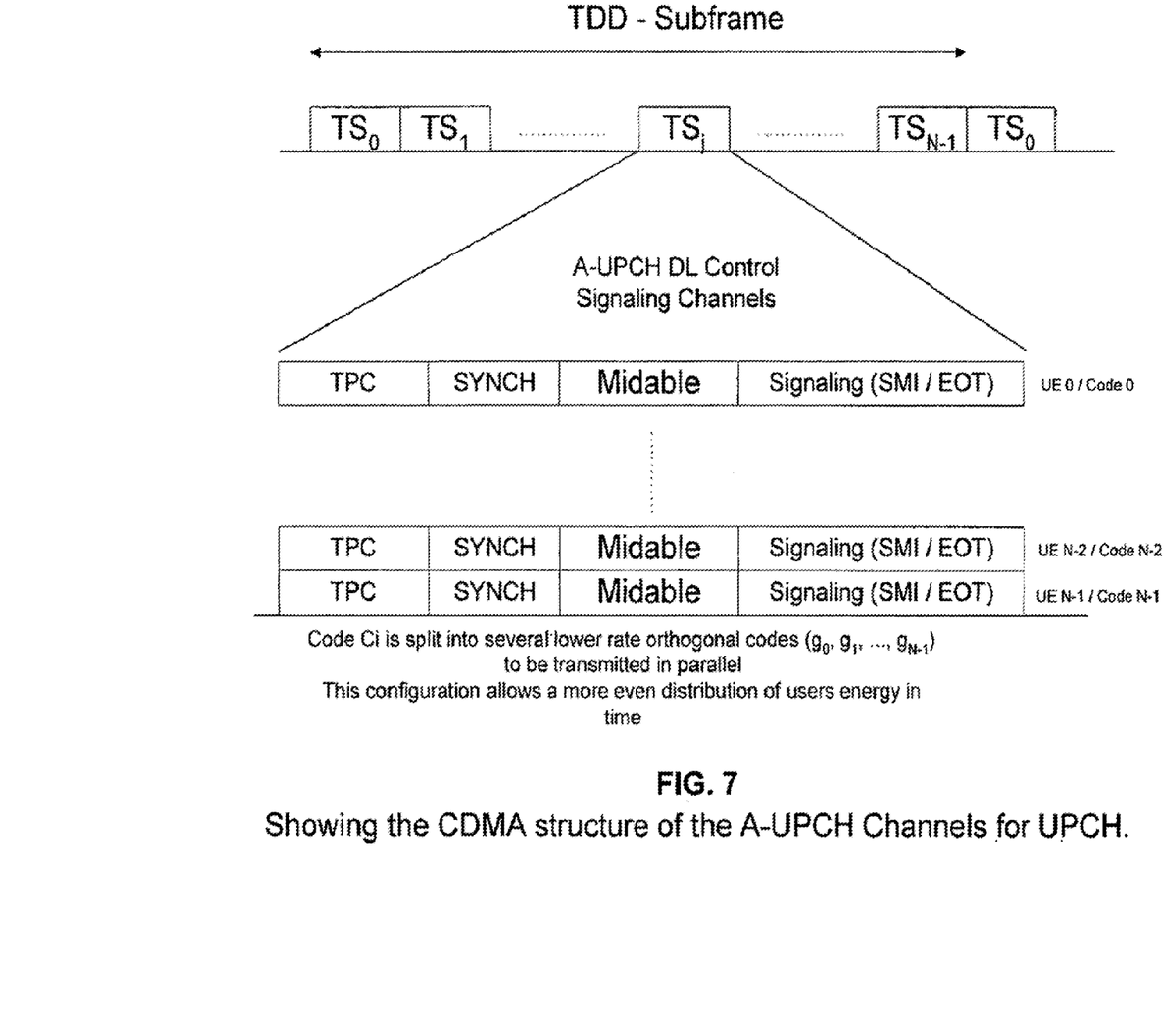
FIG. 7 illustrates a code division multiple access structure for an uplink packet channel (UPCH).

A Time Division Multiplexing (TDM) approach is shown in FIG. 6, while a Code Division Multiplexing (CDM) approach is shown in FIG. 7. Note that for TDD systems, a Midable is normally used in the middle of each frame. Clearly, in cases where very small rate channels can be assigned, CDM might be the preferred approach, otherwise the TDM approach should be used. As is the case of CSICH of CPCH, a similar functionality could be implemented for UPCH.

Figure 8:
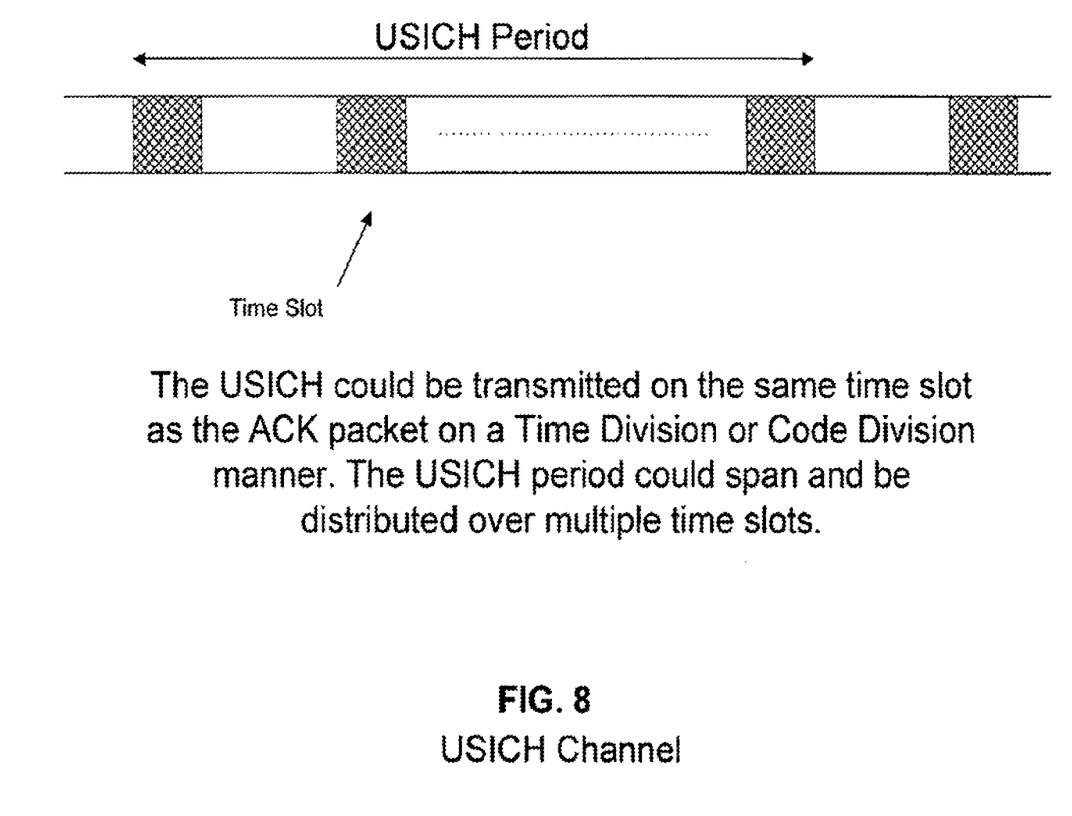
FIG. 8 is a timing diagram for an Uplink Status Indicator Channel (USICH).

In FIG. 8, a UPCH Status Indicator Channel (USICH) is shown. This channel is normally a slow rate channel and could span a number of time slots. Time Division or Code Division Multiplexing with ACK-Packets could reduce the overhead resource cost of this channel.

It may be helpful to consider another example of the deferred acknowledgement which uses a Group Channel Request (Single Group). In this example, a UE mobile station 15 randomly selects a preamble, which represents a group of sub-channels of the common channel and sends its access request (e.g. Group A consisting of sub-channels 1 to 5). Upon receiving the access request, the base station 13 (or other network element serving as Node B) examines the current usage of the requested group of channels. The base station 13 will send out: an ACK if the channel is available, a DACK if the base station keeps the request on its waiting list, or a NACK if it cannot accommodate the request in the near future.

When the base station sends an ACK message, the ACK message will specify the channel within the group of requested channels through which the mobile station 15 is authorized to send its data. In a TDD system, the ACK message will also carry timing information and other information pertaining to the TDD system. If the mobile station 15 receives an ACK, it will go ahead to send its data as instructed. If the mobile station receives a No-ACK or NACK, it will back off and restart the access request procedure again at a later time. If the mobile station 15 receives a DACK, it will neither send its data nor back off. Instead, it will wait for the next acknowledgement message. The mobile station will repeat this decision process again based on the kind of acknowledgement it receives in the next round.

Another example of the deferred acknowledgement uses a Channel Assignment technique. Again, the mobile station 15 randomly selects a preamble, but here, the selected preamble does NOT represent any specific one or group of sub-channels of a common channel. The preamble is purely for collision reduction purpose. The mobile station sends the preamble in its access request, to the base station. Upon receiving the access request, the base station 13 examines the current usage of the all common channels. The base station 13 will send out: an ACK if the channel is available, a DACK if the base station keeps the request on its waiting list, or a NACK if it cannot accommodate the request in the near future.

When the base station sends an ACK message, the ACK message will specify the channel (channel assignment) through which the mobile station shall send its data. In a TDD system, the ACK will also carry timing information and other information pertaining to the TDD system. If the mobile station 15 receives an ACK, it will send its data through the channel specified by the ACK. If the mobile station receives a No-ACK or NACK, it will back off and restart the access request procedure again at a later time. If the mobile station receives a DACK, it will neither send its data nor back off. Instead, it will wait for the next acknowledgement. The mobile station will repeat this decision process again based on the kind of acknowledgement it receives in the next round.

The deferred acknowledgement techniques, such as outlined in the above examples, may be used together with a number communication features. One example of such an optional feature relates to Broadcast Channel Availability. With this additional feature, the base station 13 broadcasts the availability on an UPCH Status indicator Channel (USICH) status, and capacity of each or a group of common channels. Mobile stations trying to request access monitor the USICH and refrain from using the unavailable signatures (preambles) unless they have become outdated or until the data in the USICH has declared the signatures (preambles) as idle.

Another optional feature utilizes Ordered List Information. Here, the base station 13 would include the ordered list (waiting list) information in its DACK message every round of ACK packet transmission. The mobile stations trying to request access monitor the deferred signatures and refrain from using them unless they are scheduled, have become outdated or the USICH has declared them as idle. As a further variant, the mobile stations that requested access and have received a DACK might also keep a maximum deferral timer T_def_max. In that case, deferred stations would not transmit until scheduled or their T_def_max has expired. Alternately, the mobile stations that received a DACK and keep a maximum deferral timer T_def_max might exit the waiting list when their T_def_max has expired. Essentially, the deferred UE would consider its deference invalid if it is not scheduled within T_def_max seconds after its actual or perceived deference instance.

In the examples discussed above, it is possible to schedule one UE for access during each cycle. In other implementations, it is also possible to schedule more than one UE with a single DACK. In the later case, the DACK message includes Scheduling Information for multiple UEs.

The deferred acknowledgement techniques may also be implemented with a variety of other features, such as closed loop power control during message transmission. As another feature example, additional control signaling could be applied on the Uplink and Downlink, to in enhance the transmission flexibility and thus system capacity. Such additional control signaling might include Transport Format Combination Indicators (TFCI), Fine Uplink Synchronization Control (FUSC), Uplink and Downlink Antenna Control, Adaptive Modulation and Coding signaling, (AMCS), etc. Power Control and other control signaling information could be transmitted over a single or multiple time slots in a Time Division Multiple Access (TDMA) manner. Alternatively, Power Control and other control signaling information could be transmitted over a single or multiple time slots in a Code Division Multiple Access (CDMA) manner. The number of time slots and the number of transport packets to be transmitted per access could be predetermined for all possible UPCH transmissions.

Another feature that may be useful is a Start of Message Indicator (SMI), similar to that of the CPCH in the FDD option. The SMI may be used on the downlink to remove unwanted uplink transmissions. A UE might falsely determine that it is scheduled for transmission, or it was scheduled for transmission but had falsely determined the code to transmit at (channel). A UE, which does not hear a proper SMI, that is an SMI transmitted over the expected DL channel (A-UPCH), should discontinue transmission and attempt another access at a later time instant. An appropriate SMI functionality is disclosed in more detail in commonly assigned U.S. Pat. No. 6,507,601 to Parsa et al. entitled "Collision Avoidance," the disclosure of which is incorporated entirely herein by reference.

In a similar fashion, it may be desirable to add an End of Transmission (EoT) message. The EOT is sent over the paired A-UPCH. This message will force a transmitting UE to terminate its current ongoing transmission. As another option, an End-of-Message (EoM) indicator could provide a signal to Node-B that the UE has completed its message transmission before reaching the end of its pre-allocated transmission interval.

Also, additional packets might be piggy-barked during a transmission if the pre-allocated message duration has not expired and additional packets have arrived for transmission. It may also be desirable to add Collision Resolution. In this case, two or more UEs transmit at the same time in the same channel, Node-B if able to detect their presence, could demodulate all of them by setting the DL power control signaling to oscillate between up and down commands, which virtually sets the TPC off.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A mobile station, comprising:
  a spread-spectrum transmitter;
  a spread-spectrum receiver; and
  a controller coupled to the spread-spectrum transmitter and the spread-spectrum receiver, to control operations of the mobile station to access a wireless communication network to transmit a data packet, including operations comprising:
    transmitting a request message over-the-air to a node of the wireless communication network by transmitting a sequence of preamble segments at sequentially increasing power levels, the request message requesting access to a resource of the network;
    receiving a first acknowledgement message over-the-air from the node and ceasing transmission of the preamble segments in response to the receipt of the first acknowledgement message, the first acknowledgement message comprising a deferral instruction;
    in response to the deferral instruction, deferring transmission of the data packet, with no further transmissions of preamble segments occurring during the deferring of the transmission of the data packet;
    receiving a second acknowledgement message over-the-air from the node, the second acknowledgement message comprising an instruction allowing access to the requested network resource; and in response to the instruction allowing access, transmitting the data packet over-the-air using the requested network resource.

2. The mobile station of claim 1, wherein the wireless communication network is a cellular network, and the requested network resource is an uplink packet channel for wireless transport of packet data over-the-air to a base station of the cellular network.

3. The mobile station of claim 1, wherein the request message identifies a specific channel resource of the wireless communication network, and the instruction in the second acknowledgement message allows access to the specific channel resource of the wireless communication network.

4. The mobile station of claim 1, wherein the instruction in the second acknowledgement message identifies a specific channel resource of the wireless communication network allocated from among a group of channel resources of the wireless communication network.

5. The mobile station of claim 4, wherein the request message identifies the group of channel resources of the wireless communication network and requests access to the identified group of channel resources.

6. A wireless base station comprising a spread-spectrum transmitter, a spread-spectrum receiver, and a controller coupled to the transmitter and receiver configured to cause the base station to implement functions comprising:

transmitting a request message over-the-air to a node of the wireless communication network by transmitting a sequence of preamble segments at sequentially increasing power levels, the request message requesting access to a resource of the network;

receiving a first acknowledgement message over-the-air from the node and ceasing transmission of the preamble segments in response to the receipt of the first acknowledgement message, the first acknowledgement message comprising a deferral instruction;

in response to the deferral instruction, deferring transmission of the data packet, with no further transmissions of preamble segments occurring during the deferring of the transmission of the data packet;

receiving a second acknowledgement message over-the-air from the node, the second acknowledgement message comprising an instruction allowing access to the requested network resource; and in response to the instruction allowing access, transmitting the data packet over-the-air using the requested network resource.

7. The wireless base station of claim 6, wherein the wireless communication network is a cellular network, and the requested network resource is an uplink packet channel for wireless transport of packet data over-the-air to a base station of the cellular network.

8. The wireless base station of claim 6, wherein the request message identifies a specific channel resource of the wireless communication network, and the instruction in the second acknowledgement message allows access to the specific channel resource of the wireless communication network.

9. The wireless base station of claim 6, wherein the instruction in the second acknowledgement message identifies a specific channel resource of the wireless communication network allocated from among a group of channel resources of the wireless communication network.

10. The wireless base station of claim 9, wherein the request message identifies the group of channel resources of the wireless communication network and requests access to the identified group of channel resources.

* * * * *